(No Model.) 2 Sheets—Sheet 1.
C. J. GRELLNER.
BARBED FENCE STRIP.
No. 386,742. Patented July 24, 1888.
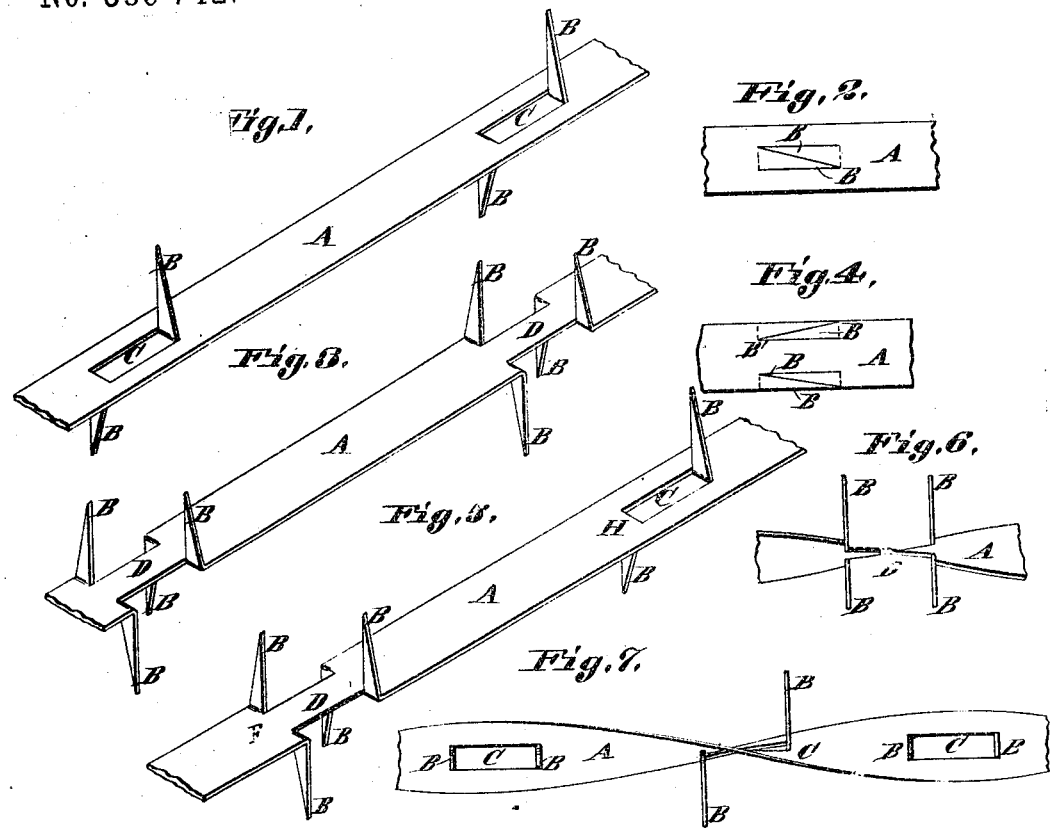
Attest:
Charles Pickles.
Edward Star
Inventor:
Christopher J. Grellner.
By Knight Bro's
Att'ys (No Model.) 2 Sheets—Sheet 2.

C. J. GRELLNER.
BARBED FENCE STRIP.

No. 386,742. Patented July 24, 1888.

Attest:
Charles Pickles.
Edward Starr.

Inventor,
Christopher J. Grellner.
By Knight Bro's
Att'ys

UNITED STATES PATENT OFFICE.

CHRISTOPHER JOS. GRELLNER, OF ST. LOUIS, MISSOURI.

BARBED FENCE-STRIP.

SPECIFICATION forming part of Letters Patent No. 386,742, dated July 24, 1888.

Application filed October 28, 1886. Serial No. 217,450. (No model.)

*To all whom it may concern:*

Be it known that I, CHRISTOPHER JOS. GRELLNER, of the city of St. Louis, in the State of Missouri, have invented a certain new and useful Improvement in Barbed Fence-Strips; of which the following is a full, clear, and exact description, reference being had to the accompanying drawings, forming part of this specification, and in which—

Figure 12:
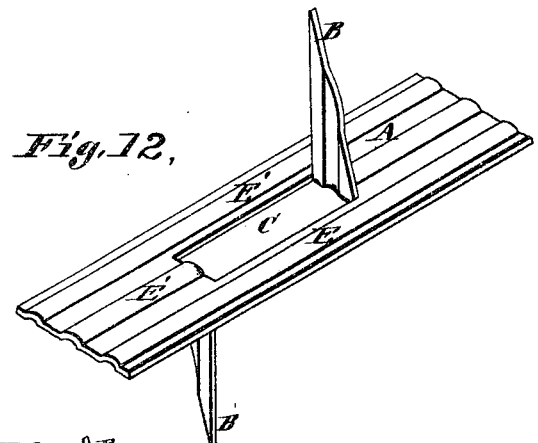
Figure 13:
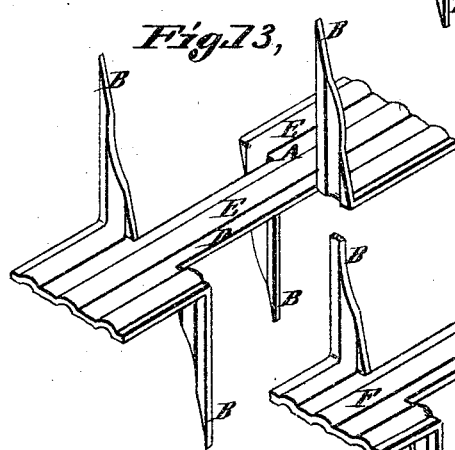
Figure 14:
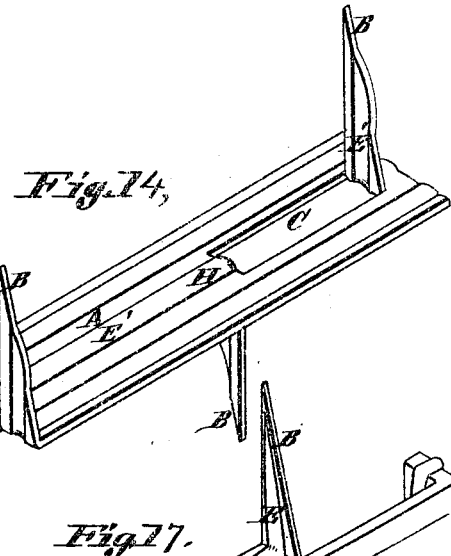
Figure 15:
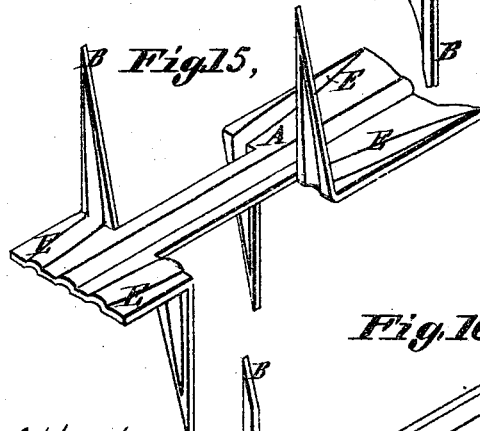
Figure 17:
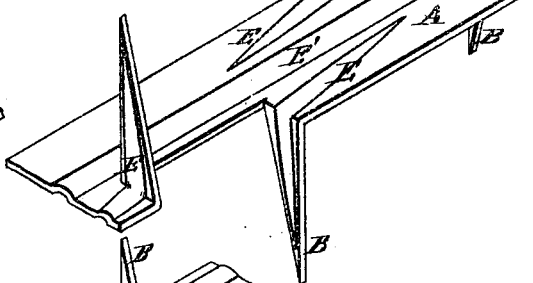
Figure 16:
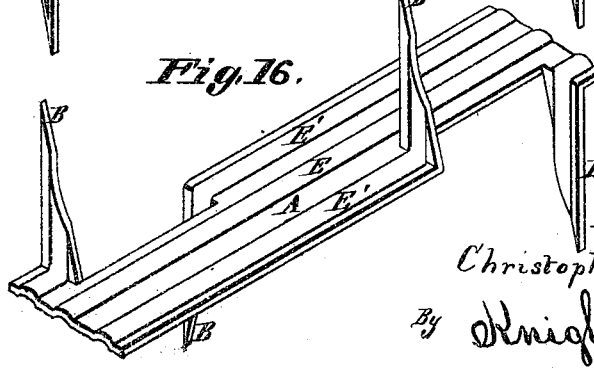

Figure 1 is a perspective view of a simple form of one of my barb fence-strips, showing twin barbs cut and rectangularly bent from the middle of the strip. Fig. 2 is a view of the same strip, showing the bars cut preparatory to bending. Fig. 3 is a perspective view of a modification, showing the twin barbs cut and bent out rectangularly from the edge of the strip. Fig. 4 is a view of the strip shown in Fig. 3, with the barbs cut preparatory to the bending of the same. Fig. 5 is a perspective view of a modification with its barbs stamped and rectangularly bent alternately from the middle of the strip and from its edge, as is shown relatively in Figs. 1 and 3. Fig. 6 is a view of another modification of the strip shown in Fig. 3, in which said strip is twisted. Fig. 7 is a view of a modification of the strip shown in Fig. 1, in which said strip is twisted. Fig. 8 is a perspective view of a modification, showing barbs formed as in Fig. 3, except that one barb in each pair is bent back on its own base into a vertical position. Fig. 9 is a view of a modification in which long depressions are stamped in the barb itself and in the strip at its base to stiffen and brace both the barb and its root or junction in the strip. Fig. 10 is a transverse section on line 12 12, Fig. 9, showing the stamped depression at the junction of the barb to the strip; and Fig. 11 is a perspective view of a modification, showing the end of a strip passed through an adjacent slot in the same strip, or in that of another strip, for securing the strips together, and also for fastening the strip to posts, trees, &c. Fig. 12 is a perspective view of a modification, showing three grooves or depressions stamped longitudinally in both the strip and its barbs, having twin barbs cut and rectangularly bent in diverse directions from the middle of the strip. Fig. 13 is a perspective view of a modification, showing three longitudinal grooves in both strip and barbs, with pairs of twin barbs cut and rectangularly bent in diverse directions in juxtaposition to each other. Fig. 14 is a perspective view of my preferred form, showing three longitudinal grooves, both in strip and barbs, with twin barbs cut and rectangularly bent in diverse directions from the middle and edges of the strip. Fig. 15 is a perspective view of a modification, showing a longitudinal groove in the middle of the strip and diagonal grooves in the strip and its barbs, with pairs of twin barbs cut and rectangularly bent in diverse directions in juxtaposition to each other. Fig. 16 is a perspective view of a modification, showing three longitudinal grooves in both the strip and its barbs, with twin barbs cut and rectangularly bent in diverse directions, the twin barbs on each edge being placed in alternate succession to each other. Fig. 17 is a perspective view of a modification, showing a longitudinal groove in the middle of the strip and diagonal grooves in the strip and its barbs, with pairs of twin barbs cut and rectangularly bent in diverse directions, the twin barbs on each edge being placed in alternate succession to each other.

The early figures embrace the simpler modifications of my barbed fence-strips, and my preferred form is shown in Fig. 14.

This invention relates to devices for metallic barbed strips for fences; and the invention consists in features of novelty hereinafter fully described, and pointed out in the claims.

Referring to the drawings, in which similar letters of reference indicate like parts, A represents my metallic fence-strip, and B B twin barbs that are cut out in pairs from the middle and edges of the strip, leaving, when cut out of the middle, an open slot at C, and when cut from the edges a narrow strip at D, the further use of which slot and narrow strip, as shown in Fig. 11, (for the attachment of the strips together and to the posts, &c.,) will be described hereinafter. The said barbs are bent out rectangularly from the strip in diverse directions, so as to present obstructive points to animals endeavoring to break bounds.

E E represent diagonal depressions that are stamped in both the barbs and adjacent portions of the strips, as in the modifications shown in Figs. 9, 15, and 17 and in transverse section in Fig. 12, and E' longitudinal grooves in both the strips and barbs. (See Figs. 12, 13, 14, and 16.) That shown in Figs. 1 and 2 is the simplest form of my fence-strip. Fig. 2 represents the twin barbs cut previous to bending, and in Fig. 1 the same barbs after they have been rectangularly bent out in diverse directions from each other. As shown in Figs. 3 and 4, the twin barbs are cut and rectangularly bent in diverse directions from the edges of the strip, each pair being in juxtaposition to the adjacent pair on the opposite side of the strip. As shown in Fig. 5, the strip combines the features shown in Figs. 1 and 3, having the twin barbs cut and formed from both the middle and edges of the strip. This modification of my barb-strip, as also in my preferred form shown in Fig. 14, is adapted for fastening to the adjoining strips and attachment to posts, &c., as illustrated in Fig. 11, and hereinafter described. In Fig. 6 is a modification in which the strip shown in Fig. 3 is twisted, so as to present the points of the barbs in varying directions, add to its strength, and prevent injury from expansion and contraction consequent on changes of temperature. A similar device is shown in Fig. 7, in which the strip shown in Fig. 1 is twisted.

Modifications of my invention in Figs. 9, 10, 15, and 17 show diagonal grooves that are stamped in both the strips and barbs and longitudinal ones in the middle of the strips to strengthen both strips and barbs; also, in the modifications shown in Figs. 12, 13, 14, and 16 are three longitudinal corrugations extending the length of the strip and barb. These corrugations, as well as the foregoing, may be stamped after the cutting of the barbs previous to their being bent, or cut and corrugated at the same time. The stamped corrugations not only stiffen the barbs themselves, but also, extending back in the diagonal form for a considerable distance along the strips and in the longitudinal one the whole length of the strip and nearly that of the barbs, they brace both the strip and the barbs, especially at the most vulnerable point—that of the attachment of the barbs. By this device the objection to stamped corrugations in barbs where the corrugations do not extend into the strip itself (that from the stiffness of the barbs themselves, and consequently lack of spring when stock comes against them, they more readily break off at the point of junction with the strip) is avoided in my device, which has a stamped depression in continuous combination with both strip and barb.

In Fig. 11 is shown my device for attaching the strips together, and also for securing the ends around a post, tree, &c., to which it is desired to fasten the strips when the modifications shown in Figs. 5, 11, and 14 are used. The fastening is effected in the following manner, illustrated in Fig. 11: The barbs next the part F in Figs. 5 and 14 are folded back transversely on the strip, as shown at G in Fig. 11, and the barb at the end of the slot at H on the same or another strip (see Figs. 5 and 14) is bent back longitudinally on the strip, as shown at I in Fig. 11. The part F is then twisted around sufficiently to be passed freely through the slot C, the cut-away portion of the strip at D (which is formed by cutting the barbs formed from the edges of the strips) fitting transversely across the slot, the said part F springing back to its normal position. The strips are securely fastened to the post, &c., or attached together, after which, if desired, the part F or H, or both, may be bent to lie flat on and correspond with each other.

When it is desired to fasten the strip to a post, tree, or any other object, it is evident that, after the aforesaid interfering barbs have been folded against the strip out of the way, by bending the end of the strip around the post or tree, &c., to which it is intended to be fastened, and passing the part G through one of the slots C in the same strip, it can be securely fastened to the said object without the use of staples or any other such means.

By the above-mentioned device for fastening my fence strips I have provided means that especially adapt them for a movable or portable fence, where stock are often refolded, and consequently the fence has frequently to be removed.

It will be seen that I have a generic twin arrangement of the barbs both in my preferred form and throughout all the modifications, and the individual members of the pairs are in all the forms bent in transverse directions to each other. I by that means (by the one operation) double the number of the barbs and double their efficiency from their diverse presentation.

I claim as my invention—

1. In a metallic fencing-strip provided with elongated slots having diagonally-divided twin barbs projecting from the uncut blank at each end of said slots, elongated necks alternate therewith, twin barbs cut from the metal body from each side of said necks, said twin barbs being diagonally divided from each other and projecting from opposite portions of the uncut blank contiguous to said necks, substantially as shown and described.

2. In a metallic barbed fencing-strip provided with an elongated slot, a fastening device consisting of an elongated neck, D, adapted to be inserted into said slot, and shouldered portion F, contiguous to the neck D, consisting of the uncut blank and the barbs contiguous to said neck D, against which blank the barbs are folded, said shouldered portion being adapted to engage one side of the strip on each side of the slot to fasten the strip to the supporting object, substantially as set forth.

CHRISTOPHER JOS. GRELLNER.

In presence of—
BENJN. A. KNIGHT,
SAML. KNIGHT.